US 8,186,514 B2

United States Patent
Bowers (10) Patent No.: US 8,186,514 B2
(45) Date of Patent: May 29, 2012

(54) TRANSPARENT CARRYING CASE FOR PORTABLE ELECTRONIC DEVICES

(75) Inventor: Andrew Christian Bowers, Hurst, TX (US)

(73) Assignee: Samsill Corporation, Fort Worth, TX (US)

( * ) Notice: Subject to any disclaimer, the term of this patent is extended or adjusted under 35 U.S.C. 154(b) by 0 days.

(21) Appl. No.: 12/578,129

(22) Filed: Oct. 13, 2009

(65) Prior Publication Data

US 2010/0089779 A1 Apr. 15, 2010

Related U.S. Application Data

(60) Provisional application No. 61/105,151, filed on Oct. 14, 2008.

(51) Int. Cl.
*B65D 81/03* (2006.01)
*B65D 85/00* (2006.01)

(52) U.S. Cl. ............... 206/522; 206/320; 383/3

(58) Field of Classification Search .......... 206/320, 206/522, 321, 594, 592; 383/3, 106, 109, 383/110; 229/78.2, 77
See application file for complete search history.

(56) References Cited

U.S. PATENT DOCUMENTS

| | | | | |
|---|---|---|---|---|
| 4,044,867 A * | 8/1977 | Fisher | ............ | 190/107 |
| 4,287,250 A * | 9/1981 | Rudy | ............ | 428/166 |
| 4,308,988 A * | 1/1982 | Jiveman et al. | ............ | 229/80 |
| 4,562,219 A | 12/1985 | Frye | | |
| 4,894,265 A * | 1/1990 | Chang et al. | ............ | 428/34.6 |
| 4,943,475 A | 7/1990 | Baker et al. | | |
| 5,071,061 A * | 12/1991 | Willis | ............ | 229/303 |
| 5,102,695 A | 4/1992 | Guest et al. | | |
| 5,217,131 A * | 6/1993 | Andrews | ............ | 220/1.5 |
| 5,924,574 A * | 7/1999 | Ku | ............ | 206/583 |
| 6,139,188 A * | 10/2000 | Marzano | ............ | 383/110 |
| 6,149,002 A * | 11/2000 | Tiramani et al. | ............ | 206/320 |
| 6,213,669 B1 | 4/2001 | Yamamoto | ............ | 402/73 |
| 6,334,533 B1 | 1/2002 | Hollingsworth et al. | | |
| 6,375,009 B1 | 4/2002 | Lee | ............ | 206/522 |
| 6,415,920 B1 | 7/2002 | Tiramani et al. | ............ | 206/320 |
| 6,513,658 B1 * | 2/2003 | Adkins | ............ | 206/522 |
| 6,763,942 B1 * | 7/2004 | Yeh | ............ | 206/320 |
| D512,219 S * | 12/2005 | Yeo | ............ | D3/276 |
| 7,191,926 B1 * | 3/2007 | Costantino et al. | ............ | 224/605 |
| 7,549,535 B2 * | 6/2009 | Pelo | ............ | 206/320 |

(Continued)

OTHER PUBLICATIONS

Sumdex, Inc., web page product description: Aircube (TM) Notebook Sleeve—for MacBook; copyright 2008; pp. 1 http://www.sumdex.com/catalog/product_info.php?products_id=365.

(Continued)

*Primary Examiner* — Steven A. Reynolds
(74) *Attorney, Agent, or Firm* — Whitaker Chalk Swindle & Schwartz PLLC; Stephen S. Mosher (57) ABSTRACT

A protective case for a portable electronic device combines a first side panel, a second, transparent side panel opposite the first side panel, and a peripheral side panel that is connected to both the first and second side panels. The second, transparent side panel is formed of first and second transparent layers that are bonded together to form a panel having a plurality of uniform, trapped-gas cells, each one fully sealed from all other cells. The transparent side panel enables full visibility of the contents of the case while providing cushioning for the contents. The first side panel also provides cushioning.

15 Claims, 7 Drawing Sheets

U.S. PATENT DOCUMENTS

| | | | | |
|---|---|---|---|---|
| 2003/0052035 | A1 | 3/2003 | Dickinson | 206/522 |
| 2004/0171469 | A1* | 9/2004 | Brandolini et al. | 493/186 |
| 2005/0191918 | A1 | 9/2005 | Langley et al. | |
| 2005/0284791 | A1 | 12/2005 | Sadow | 206/522 |
| 2006/0010588 | A1 | 1/2006 | Schuster et al. | 2/455 |
| 2006/0169753 | A1* | 8/2006 | Piucci et al. | 229/68.1 |
| 2007/0095711 | A1* | 5/2007 | Thompson et al. | 206/522 |
| 2007/0246386 | A1* | 10/2007 | Nykoluk et al. | 206/320 |

OTHER PUBLICATIONS

Belkin International, Inc., web page product description: Window Sleeve; copyright 2000-2009; pp. 1; http://catalog.belkin.com/IWCatProductPage.process?Product_Id=399332.

Etsy, Inc., web page product description: Laptop Sleeve, See-Through Window, Show Off Your MAC, Padded Laptop Tote; copyright 209; pp. 1-4 http://www.etsy.com/view_listing.php?listing_id=29171555.

Web page product description: MacCase; pp. 1; http://mac-case.com/Products/MacCase%20Sleeves.html.

LC Corporation, web page product descripton: AIRCELL, Laptop Bag, pp. 1-4; http://www.zippack.com/product_laptop_eng.htm.

LC Corporation, web page product descripton: AIRCELL, Air Cell Technology and Products, pp. 1 http://www.zippack.com/aircell_eng.htm.

RedMaloo, web pages products; 3 pages; http://redmaloo.com/products.php.

* cited by examiner

TRANSPARENT CARRYING CASE FOR PORTABLE ELECTRONIC DEVICES

CROSS-REFERENCE TO RELATED APPLICATION

The present and foregoing related patent applications all claim priority from U.S. Provisional Patent Application No. 61/105,151, filed Oct. 14, 2008 and entitled Equipment Case for Portable Electronic Devices, by the same inventor.

BACKGROUND OF THE INVENTION

1. Field of the Invention

The present invention generally relates to carrying cases for portable electronic devices and more particularly to carrying cases having a combination of cushioning features and see-through panels.

2. Description of the Prior Art

Padded containers for all sorts of fragile devices or other products subject to damage in the event of carelessness are widely available. Most such containers are opaque and do not permit observation of the contents without opening the container. This is a disadvantage while proceeding through an airport security facility, for example, where bags are often required to be opened to view the contents. Some containers have only a small area window, which is suitable only for verifying the presence of the contents while obscuring other features of the contents, or preventing positive identification of the contents. Other containers, which may have some sort of window for observing the contents, provide this feature without adequate padding or other protection against damage either to the window or to the contents in the vicinity of the window if some object should happen to fall upon or strike the container on or near the window area of the container.

Still other protective containers because of their copious padding are large, bulky, and often unwieldy during handling, particularly for thin or flat items such as laptop computers and the like. Other such containers rely on inflatable cushions placed at various places in or around the container. Such cushions require valves for inflation or deflation and are prone to leak. Other types of inflatable, air-filled cushions require continuous passages for air to flow between segments of the cushion and are thus susceptible to complete deflation and loss of cushioning if a single puncture occurs anywhere in the material of the cushion. Further, air-filled cushions having bubble-like segments interconnected by air passages for inflation or to permit equalization of air pressure have a disadvantage in that external pressure on one segment displaces the air in that segment, resulting in a loss of protective padding at the location of that segment. One solution to this disadvantage is to inflate the cells to a higher pressure. However, this remedy adds an extra manufacturing step and corresponding cost. Moreover, once the inflation pressure is lost or leaks out, it cannot be readily repaired without special equipment.

Thus, a need is presented for a container that both fully protects the contents against damage, permits a full and clear view of the contents at all times, does not require inflation or valves, and yet is not bulky or heavy or awkward to handle, etc. Such features would be especially useful for traveling with laptop or notebook computers, reading or writing devices, or other electronic devices or instruments.

SUMMARY OF THE INVENTION

To solve the aforementioned disadvantages found in the prior art carrying cases or enclosures, it is an object of the present invention to provide a protective case or sleeve for a laptop computer or other portable electronic device, instrument, or object of similar scale that provides the functions of a carrying case in combination with a transparent panel enabling visibility of the contents, and substantial padding or cushioning against the minor bumps and contact typically encountered by such devices during traveling or transport.

It is further an object of the present invention to provide such protection in a protective case or sleeve that is trim and light in weight, without the bulk and weight of prior art carrying cases.

It is further an object of the present invention to provide such protection in a protective case or sleeve that has at least one side thereof, such as the front side, that is optically clear—that is, fully transparent—for clear visibility of the contents of the case or sleeve yet also provides the requisite cushioning against moderate contact and bumps.

It is further an object of the present invention to provide such protection in a protective case or sleeve such that the entire front side of the case or sleeve is optically clear.

It is further an object of the present invention to provide such protection in a protective case or sleeve such that the cushioning provided by the optically clear front panel maintains its cushioning properties even though the panel may become punctured at some point.

It is further an object of the present invention to provide such protection in a protective case or sleeve that does not require inflating some portion of the case or sleeve and that does not require a valve for inflating or deflating any cushioning provided in the case or sleeve. Such a case or sleeve has a much reduced likelihood that a leak of any air in the cushioned panel will occur and reduce the effectiveness of the protective case or sleeve.

It is further an object of the present invention to provide such protection in a protective case or sleeve that provides resilient cushioning of a back-side panel opposite the optically clear front panel.

Accordingly there is provided a protective case for a portable electronic device, comprising a first side panel including at least one cushioning layer and a second, transparent side panel, connected to the first side panel around corresponding perimeters thereof to form the case, wherein the second side panel is formed of first and second transparent layers bonded together along respective borders defining a plurality of closely-spaced, trapped-gas cells disposed between the first and second transparent layers, the cells having a gas trapped therein and being fully sealed from each other.

In other aspects, the protective case may include an openable seam disposed along and between at least a portion of the connected perimeters of the first and second side panels, and at least one continuous fastener disposed along the openable seam for opening and closing the seam.

In an alternate embodiment a protective case is provided comprising a multi-faceted grid of a plurality of sealed, transparent, gas-filled cells configured to form a transparent front side panel of the case and attached along a periphery thereof to a rear side panel having at least one cushioning layer, the periphery including an openable seam along at least one side that is openable by at least one zip fastener.

In other aspects, the transparent front side panel of the protective case comprises a plurality of uniform geometrical segments, each said segment forming a cell that is sealed around its perimeter thereby trapping therewithin a gas at substantially ambient pressure, wherein the transparent front side panel is formed by first and second layers of flexible and optically clear material bonded together along sealed borders surrounding each said cell.

DETAILED DESCRIPTION OF THE INVENTION

The present invention comprises a protective carrying case for a portable electronic device that is constructed to include at least one panel or side that is fully transparent as well as providing substantial cushioning properties. The transparent panel permits full visibility of the contents of the case. The structure of the panel provides cushioning by means of an array of closely-spaced, sealed, trapped-gas cells formed in the panel. Other panels of the case, like the transparent panel, may be flexible yet provide substantial cushioning to protect the instrument contained therein. The transparent panel permits full visibility and ready identification of the contents, which is an advantage when proceeding through security check points in transportation terminals, government buildings, public facilities, universities, schools, and the like. The transparent panel further permits visibility of unique aesthetic or decorative or identifying characteristics of the instrument, device, or article contained within the case. Colored tints may be incorporated in the transparent material of the panel without diminishing the essential quality of its transparency. Such tints may be used to impart a distinctive appearance to the case.

In the detailed description and drawings that follow, one embodiment of the invention is shown for carrying a laptop computer to illustrate the principles of the invention. However, it will be appreciated that the combination of features described herein and set forth in the claims appended to this description may be readily applied to a wide variety of carrying or storage cases, sleeves, pouches, envelopes, boxes or other containers adapted to many different kinds of products and articles that may be protected in this way. Thus, the invention is not limited to the particular illustrative embodiment but extends to all such cases having at least one transparent panel constructed with an array of trapped-gas cells to provide cushioning of the device or other contents contained within the case. The term "trapped-gas cell" refers to a sealed cell that encloses a volume of a gas at approximately ambient air pressure at the time and place of manufacture. In the illustrated embodiment, air is utilized as one of the suitable alternatives for the gas that is trapped in the individual, fully sealed cells that comprise the transparent panel. Thus, one alternative term for a trapped-gas cell is "air cell." However, it should be appreciated that the "air cells" of the present invention are constructed differently from the well-known bubble pack type of protective packaging, as will be described.

Figure 1:
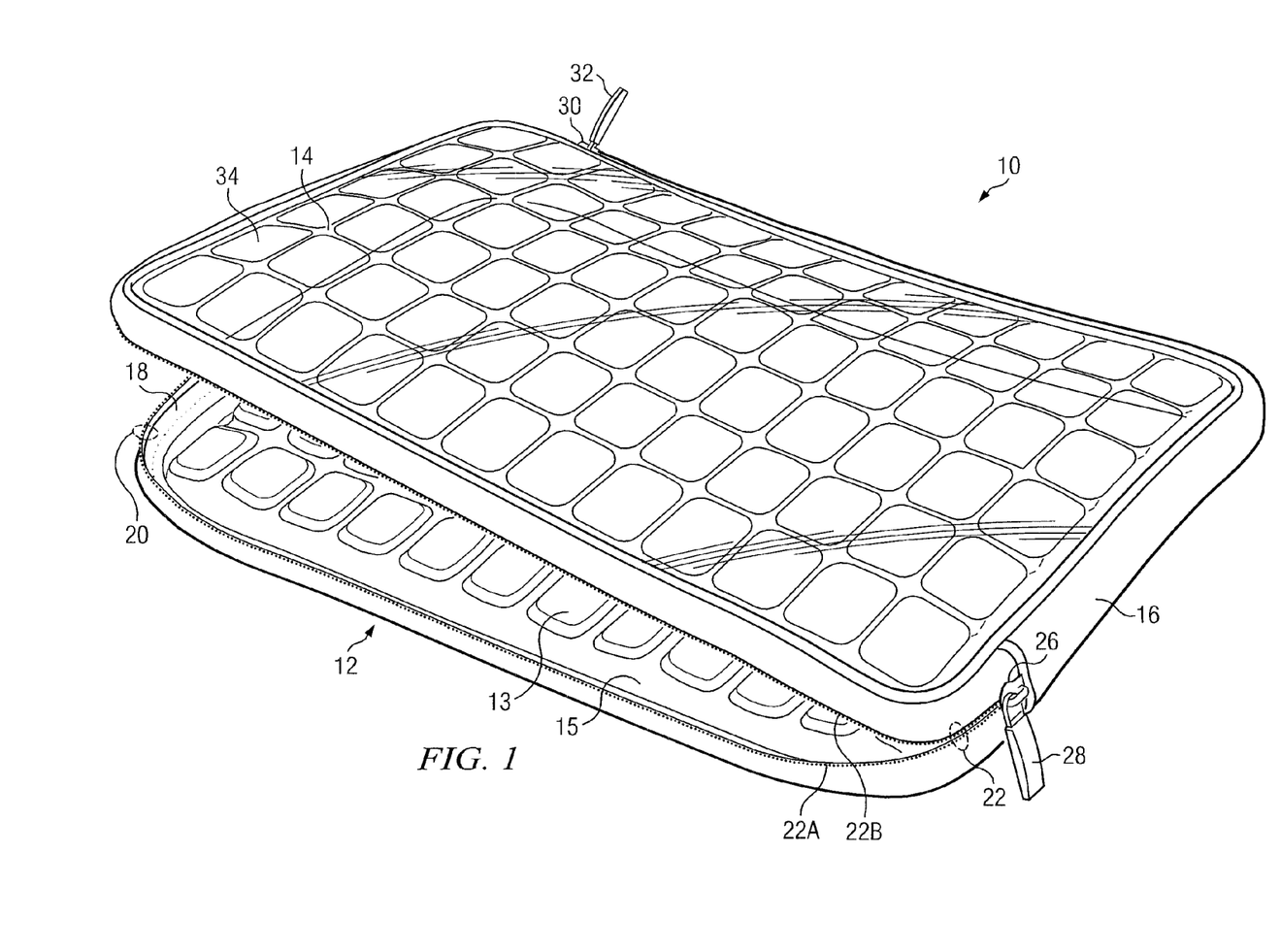
FIG. 1 illustrates a pictorial view of a protective case for a portable electronic device having a transparent upper or front side panel and further having an array or grid of uniform rectangular gas-filled cells formed in the transparent upper or front or first side panel of the protective case according to one embodiment of the present invention.

FIG. 1 illustrates a pictorial view of a protective case for a portable electronic device such as a laptop computer. The case illustrated has a rectangular overall shape corresponding to the intended use for the illustrated embodiment. It will be appreciated that various shapes are possible depending on the particular type of device or article the case 10 is adapted to. The case 10 includes a first (lower or back) side panel 12 connected to a second (upper or front) side panel 14 via a peripheral side panel 16 around the entire periphery of the first 12 and second 14 side panels, thereby forming the enclosure of the case 10. The first side panel 12 may in general be constructed as a flexible, padded panel such as by laminating suitable fabrics and padding layers together. The first side panel 12 includes raised pads 13 distributed uniformly over the interior area 15 of the panel 12. The raised pads correspond to the same size and shape of the trapped-air cells of the second side panel 14. In other embodiments, raised pads 13 may not be required, the first side panel 12 being constructed as a cushioned panel without such features as the raised pads. Further, the first side panel 12 may be formed as a single sheet of cushioned material.

The second side panel 14 is transparent, being constructed of optically clear materials. Further, the transparent panel 14 includes an array of trapped-gas cells 34, preferably uniform in shape and size, which provide cushioning against bumps and handling accidents that might damage the device enclosed in the case 10. In a typical implementation, the trapped-gas cells 34 may be individual sealed compartments filled with air, generally at ambient pressures. Such trapped-gas cells 34, when filled with air at ambient pressures, may be referred-to as "air cells." However, such air cells are not to be confused with the air cells used in conventional packaging technology because the construction of the trapped-gas cells 34 of the present invention is different in several essential ways, as will be described herein below. One further attribute of the first and second side panels 12, 14 is that corresponding ones of the uniform rectangular raised pad segments 13 and cells 34 are generally placed directly opposite one another to provide maximum cushioning.

Continuing with FIG. 1, an opening 18 is defined along at least a portion of the peripheral side panel 16 as shown. The opening 18, for example, may be disposed in one edge of the case 10 between the first 12 and second 14 side panels, or it may extend around the periphery of the case 10 to include at least two or more of the edges to facilitate opening the case 10 to insert or remove a device into or out from the case 10 interior. The opening 18 may be configured as an openable seam 20. While the openable seam 20 is shown along one edge of the opening 18, it will be understood that the openable seam 20 is disposed along both edges of the opening 18. The openable seam 20 may be secured with a zip fastener or hook-and-loop strip fastener, as two illustrative examples, disposed along the length of the openable seam 20 in the peripheral side panel 16.

The zip fastener 22 illustrated in FIG. 1 is a representation of a conventional zipper 24 having a series of many individual teeth (not shown because the construction of a zip fastener such as a conventional zipper 24 is well known in the art) disposed along both sides 22A, 22B of the openable seam 20. Such fastener may be operated by a slider 26 that is pulled along by a handle 28 to open or close the respective teeth disposed along the openable seam 20. The zip fastener may alternatively be configured as a continuous zip fastener 22 having a single continuous track disposed along each first and second side or edge 22A, 22B of the length of the openable seam 20. Such fasteners may employ a male track along one edge 22A and a female track along a corresponding edge 22B. It should be appreciated that the illustrated zip fastener is intended to be representative of the wide variety of implementations of zip fasteners available, which are equivalent in function and essential structure—that is, having a dual track disposed along each side of an openable seam and a sliding carriage for respectively opening or closing the seam as it is slid along the seam—to those described herein above. Equivalent zip fasteners may include those formed as extruded male and female tracks, one on each side of the openable seam, that do not require a slider but are closed by pressing the tracks together and opened by pulling them apart.

Continuing with FIG. 1, in the embodiment shown, the openable seam 18 extends around two sides and three corners of the case 10. The zip fastener 22, shown along the openable seam 18 and extending just past the adjoining corners, includes two sliders 26, 30, each slider having a handle 28, 32 respectively for pulling the slider along the tracks at the edges 22A, 22B. In other embodiments to be described, the openable seam 18 may be shorter and/or the zip fastener may be equipped with a single slider (e.g., slider 26) or, in some alternate embodiments, without a separate slider.

Figure 2:
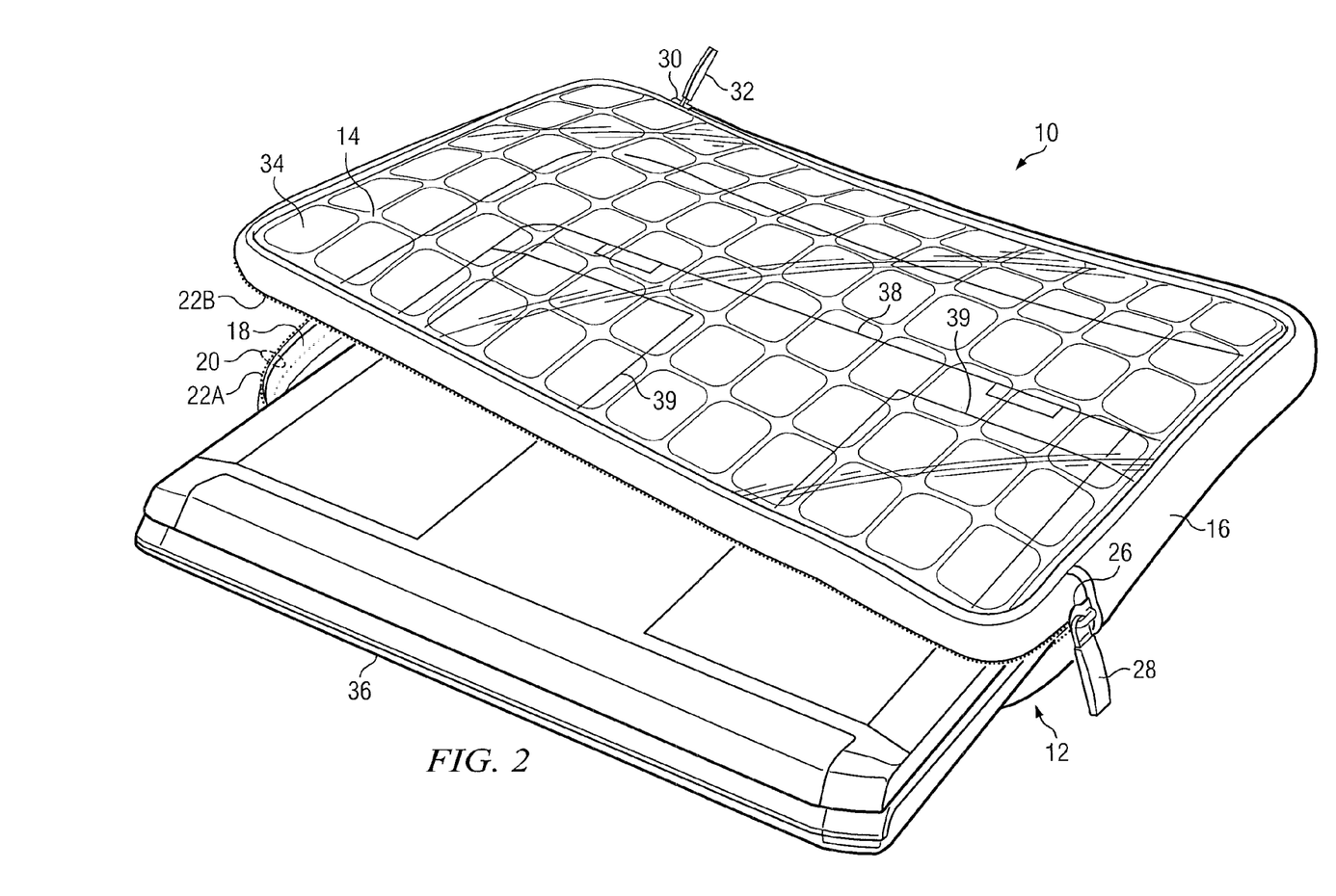
FIG. 2 illustrates a pictorial view of the embodiment of FIG. 1 in use with a laptop computer partially inserted into the case and the outline of the portion of the laptop computer inside the case visible through the transparent upper or front side panel in the drawing.

FIG. 2 illustrates a pictorial view of the embodiment of FIG. 1 in use with a laptop computer partially inserted into the case. The outline 38 of the portion of the laptop computer 36 inside the case 10 is visible through the transparent second side panel 14 in the drawing. Additional characteristics of the device within the case 10, such as the feature lines 39 also readily visible through the transparent panel 14, indicate the utility of the present invention for viewing and identifying the device 36 stored within the case 10. Further, the degree of transparency afforded by the optically clear materials used for the second side panel 14 is sufficient to read text on labels or separate sheets or other types of indicia disposed on the exterior of the device 36. All other features shown in FIG. 2 are identical with FIG. 1 and bear the same reference numbers.

Figure 3A:
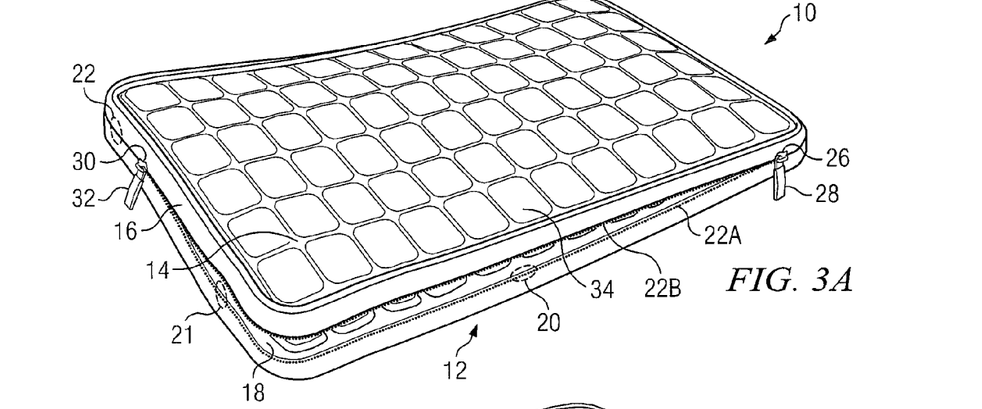
FIG. 3A illustrates a pictorial view of one alternate embodiment of the present invention having an openable seam along at least first and second edges of the peripheral side panel of the case, wherein the openable seam may be opened or closed with a zip fastener.
Figure 3B:
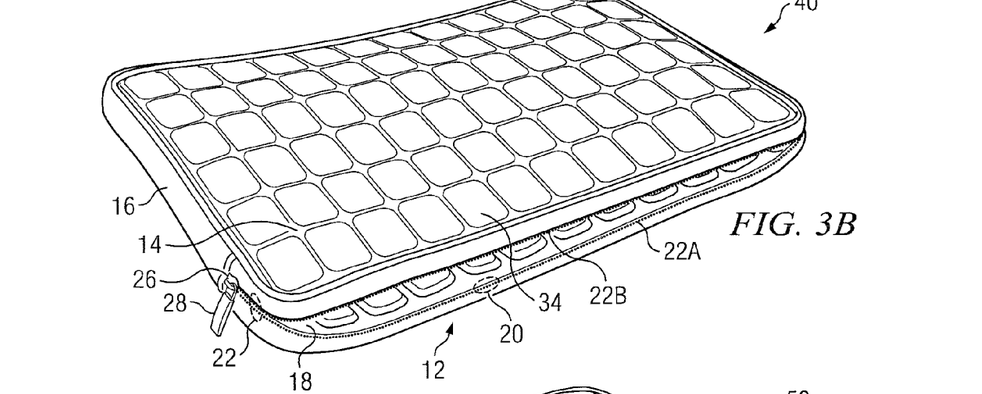
FIG. 3B illustrates a pictorial view of another alternate embodiment of the present invention having an openable seam along at least a first side and extending just around first and second proximate corners of the periphery of the case, wherein the openable seam may be opened or closed with a zip fastener.
Figure 3C:
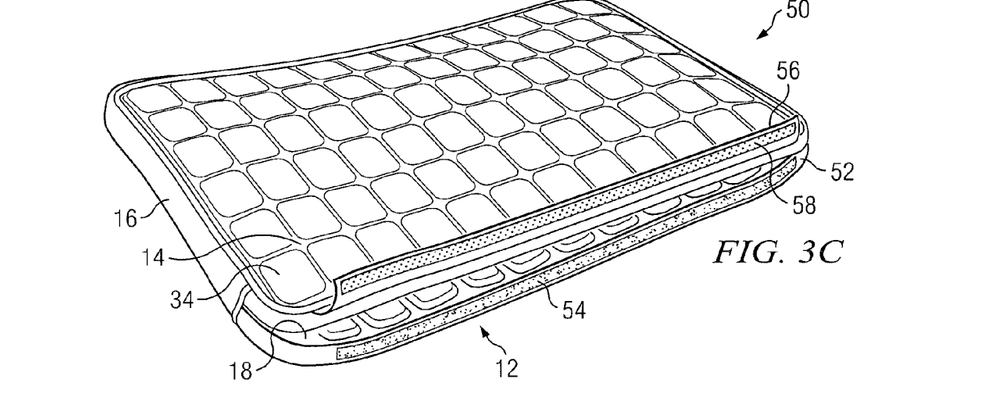
FIG. 3C illustrates a pictorial view of another alternate embodiment of the present invention having an openable seam along at least a first side and extending just around first and second proximate corners of the periphery of the case, wherein the openable seam may be opened or closed with a hook-and-loop strip fastener.

FIGS. 3A, 3B, and 3C illustrate several representative variations in closure mechanisms that may be used to close and open the openable seam 18. Persons skilled in the art will recognize there are many possible kinds of closure mechanisms that could be adapted without changing the basic concept of the present invention. That only a few are herein illustrated is intended in no way to limit the adaptations that may be made to accommodate particular embodiments and circumstances. These few suggestions rather serve to illustrate the principles employed in the construction of the present invention. Some examples of other closure mechanisms that may be suitable for some implementations of a carrying case having a transparent panel could include straps or belts, elastic bands, snaps, buttons, latches, magnetic catches or strips, etc. All such fastening mechanisms that provide a way to open, close, and secure the openable seam 18 may be deemed equivalent structurally and functionally. Features in FIGS. 3A, 3B, and 3C bearing the same reference numbers as in FIGS. 1 and 2 are the same as described in FIGS. 1 and 2.

FIG. 3A illustrates a pictorial view of one alternate embodiment of the present invention having an openable seam 18 along at least first 20 and second 21 edges of the peripheral side panel 16 of the case 10, wherein the openable seam 18 may be opened or closed with a zip fastener 22.

FIG. 3B illustrates a pictorial view of another alternate embodiment of the present invention having an openable seam 18 along at least a first edge 20 and extending just around first and second proximate corners of the peripheral side panel 16 of the case 40, wherein the openable seam 18 may be opened or closed with a zip fastener 22.

FIG. 3C illustrates a pictorial view of another alternate embodiment of the present invention having an openable seam 18 along at least first 52 and second 56 edges and extending just around first and second proximate corners of the peripheral side panel 16 of the case 50, wherein the openable seam 18 may be opened or closed with a hook-and-loop strip fastener. In the illustration, a loop material strip 54 of a hook-and-loop fastener is attached to the first edge 52 of the peripheral side 16 and a hook material strip 58 of the hook-and-loop fastener is attached to the second edge 56 of the peripheral side 16. In the figure, the second edge 56 is shown as a flap that is turned upward to expose the strip of hook material attached thereto. In use, the flap of the second edge 56 is disposed over the first edge 52 in an overlapping manner to secure the respective edges of the openable seam 18 together.

FIGS. 4A, 4B, 4C, and 4D illustrate several representative variations in the shapes of the uniform trapped-gas cells that may be used in the transparent second side panel 14 of the present invention. Each figure replicates the embodiment of FIG. 1 except for the shapes of the trapped-gas cells 34 in the array in the transparent side panel 14. However, as shown in the respective FIGS. 4, the transparent side panels and the trapped-gas cells are given distinctive reference numbers in the figures. The pattern of the uniform array of cells is generally the same because of the need to provide full cushioning performance over the whole surface area of the transparent second side panel. Further, as has been found through experimentation, the size of each individual cell is preferably kept to a relatively small area, generally in the range of 1.0 to 1.5 square inches in the plane of the second side panel. Thus, cells having a width and length dimension of 1.0×1.0 inches or 1.0×1.5 inches provide the best combination of transparency and cushioning. If the cells are much larger, they are less able to maintain adequate cushioning because the two layers of transparent material that are bonded together in the boundaries between the individual cells are more likely to come in contact in the event of the case 10 being bumped against a hard object of small dimensions. Moreover, with large cells, the gas or air trapped inside the cells is more likely to be displaced away from the point of impact with the external object, thus diminishing the cushioning performance. Such contacts would provide little or no cushioning. On the other hand, if the cells are much smaller, the overall transparency of the second side panel is compromised by the more dense grouping of the cells.

Although several different shapes of the trapped-gas cells are shown in FIGS. 4A, 4B, 4C, and 4D, these shapes are described to illustrate that various shapes may be used. However, the preferred shape is rectangular (or square) because it is a shape, which provides a clean appearance that lets light travel through the transparent side panel without as many reflections that could impair the visibility of the contents. The rectangular or square shape also forms an uncomplicated enclosure that readily allows the gas or air trapped or injected inside to distribute itself evenly. In the illustrated variations shown in the figures, persons skilled in the art will recognize that the effects of more complicated shapes may be mitigated through adjustments in the size and outline of the respective cell outlines. Thus, for example, the star-shaped cells of the transparent panel of FIG. 4D may be advantageously enlarged slightly and the population of cells disposed in the area of the transparent side panel correspondingly reduced. Alternatively, the shape of the star figure may be modified with rounded apexes, etc.

Figure 4A:
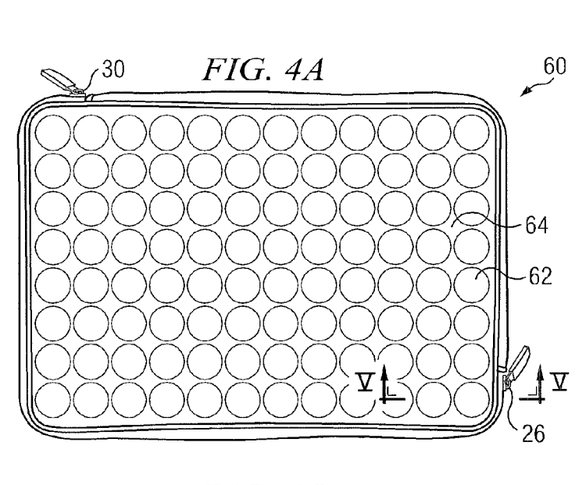
FIG. 4A illustrates a top-side plan view of one embodiment of the protective case of the present invention having an array or grid of uniform circular gas-filled cells formed in the transparent upper side panel of the protective case.

FIG. 4A illustrates a top-side plan view of one embodiment 60 of the protective case 10 of the present invention having an array or grid of uniform circular gas-filled cells 62 formed in the transparent side panel 64 of the protective case 60.

Figure 4B:
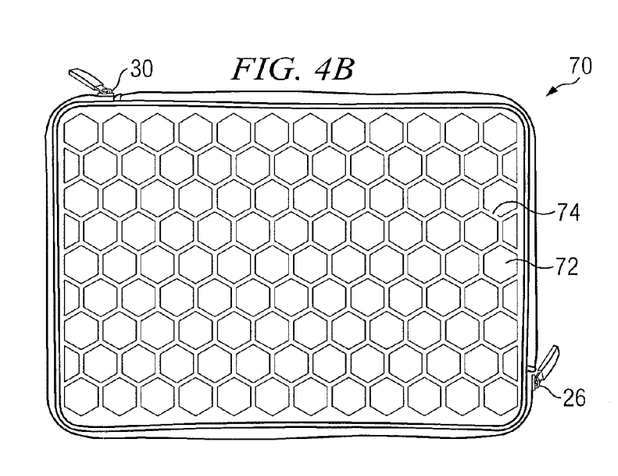
FIG. 4B illustrates a top-side plan view of one embodiment of the protective case of the present invention having an array or grid of uniform hexagonal gas-filled cells formed in the transparent upper side panel of the protective case.

FIG. 4B illustrates a top-side plan view of one embodiment 70 of the protective case 10 of the present invention having an array or grid of uniform hexagonal gas-filled cells 72 formed in the transparent side panel 74 of the protective case 70.

Figure 4C:
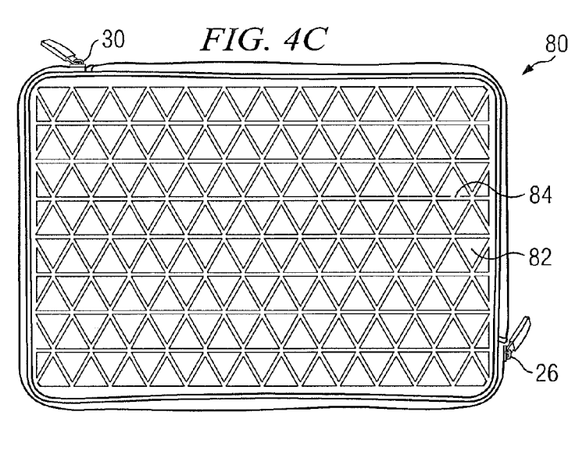
FIG. 4C illustrates a top-side plan view of one embodiment of the protective case of the present invention having an array or grid of uniform triangular gas-filled cells formed in the transparent upper side panel of the protective case.

FIG. 4C illustrates a top-side plan view of one embodiment 80 of the protective case 10 of the present invention having an array or grid of uniform triangular gas-filled cells 82 formed in the transparent side panel 84 of the protective case 80.

Figure 4D:
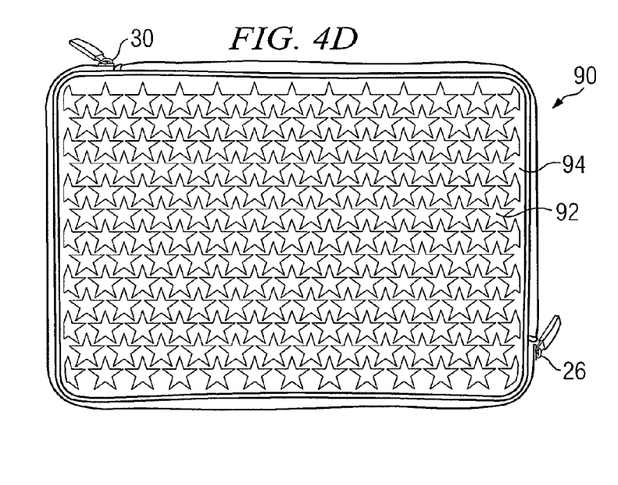
FIG. 4D illustrates a top-side plan view of one embodiment of the protective case of the present invention having an array or grid of uniform star-shaped gas-filled cells formed in the transparent upper side panel of the protective case.

FIG. 4D illustrates a top-side plan view of one embodiment 90 of the protective case 10 of the present invention having an array or grid of uniform star-shaped gas-filled cells 92 formed in the transparent side panel 94 of the protective case 90.

Figure 5A:
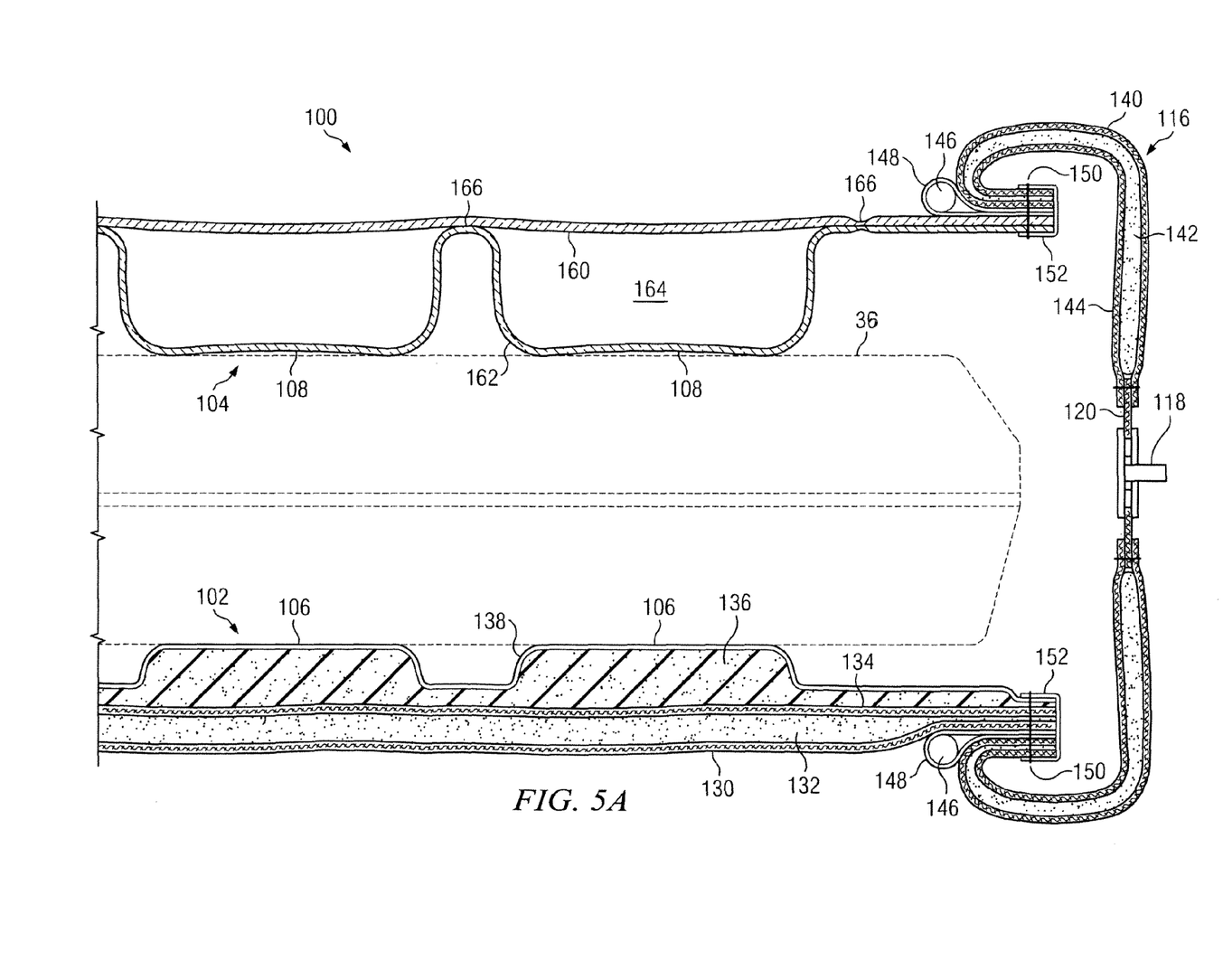
FIG. 5A illustrates a detailed cross section view of a portion of one edge of a protective case according to the embodiment of the present invention depicted in FIG. 4A showing the construction of the upper (front) and lower (back) panels of the protective case.
Figure 5B:
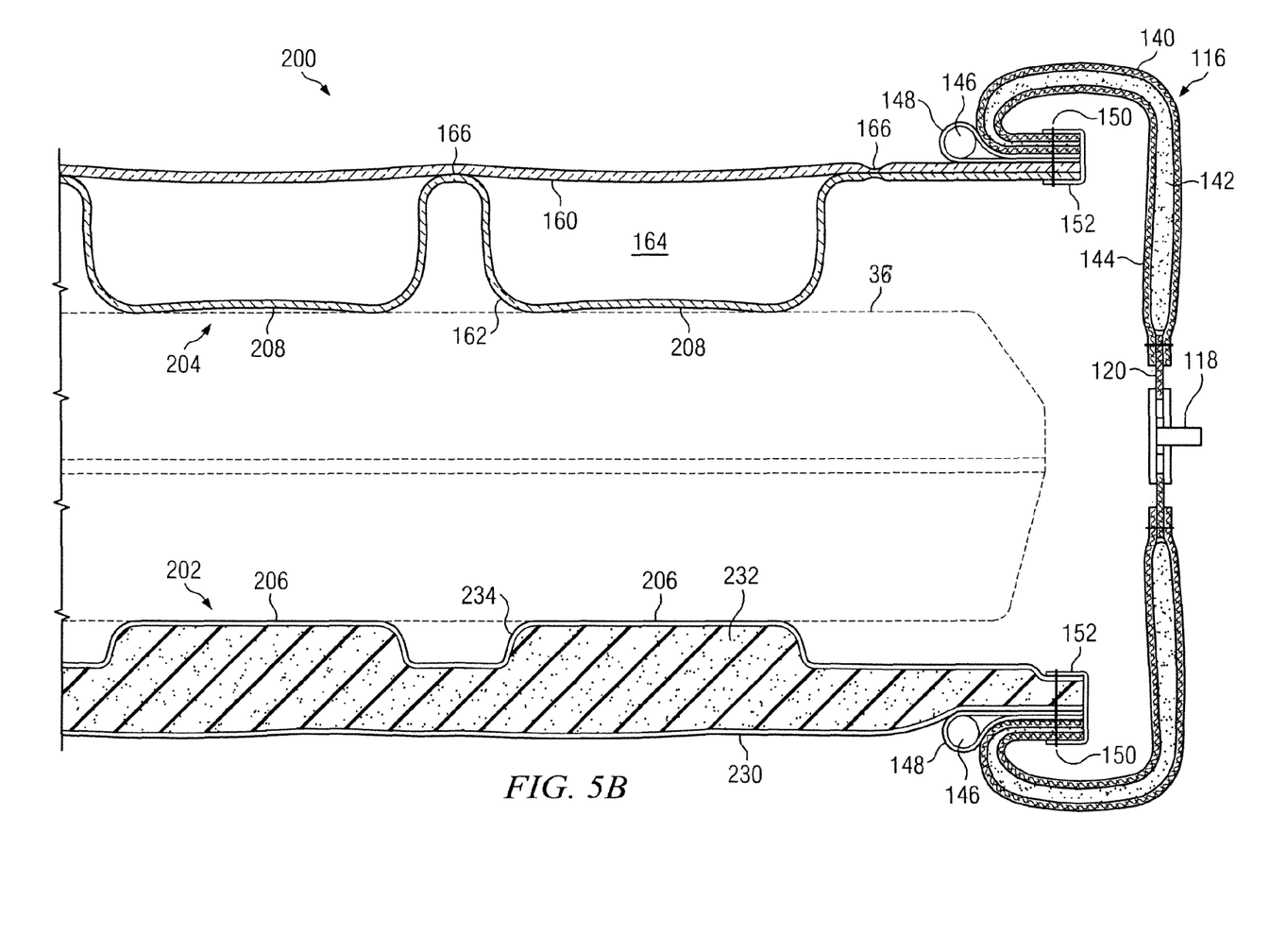
FIG. 5B illustrates a detailed cross section view of a portion of one edge of a protective case according to an alternate embodiment of the present invention depicted in FIG. 4A showing the construction of the upper (front) and lower (back) panels of the protective case.

Referring to FIGS. 5A and 5B, details of the construction of several embodiments of the first and second side panels will be described. FIGS. 5A and 5B depict a cross section of a portion of the edge at one corner of the embodiment illustrated in FIG. 4A, as indicated by the Roman Numerals V-V. Regarding the construction and outlines of the first 102, 202 and second 104, 204 side panels, the respective cross sections would appear substantially the same as those depicted in FIGS. 5A and 5B when taken from other angles through the case 10. A device 36 contained within the case 10 is indicated by a dashed line outline of a laptop computer. It should be recognized that FIGS. 5A and 5B are representative of the cross sections of possible shapes (as appear in the plan views of FIGS. 4A through 4D) of the trapped-gas cells used in the transparent (second side) and cushioning (first side) panels of the case 10. Important features of the first side panel 102, 202 are its laminated construction and the inward extension of the individual cushion pads 106, 206 such that a device 36 contained within the case 10 rests on or contacts the most inward surface of the cushion pads 106, 206. Important features of the second side panel 104, 204 are its transparent, laminated construction, the substantially flat outer surface 112 of the transparent panel, and the inward extension of the individual trapped-air cells 108, 208 such that the inward surface of the cells 108, 208 is in contact with the device 36 contained within the case 10. A further feature of both first and second side panels is their flexibility in the preferred embodiment. However, some embodiments, for example, may be constructed with a rigid first side panel laminated to one or more internal cushioning layers. Such rigid construction of the first side panel may be advantageous in certain configurations of the case 10 where the case must maintain a certain structural form for adequate protection, or ease of use, or to facilitate structures for positioning the device(s) contained within the case 10.

FIG. 5A illustrates a detailed cross section view 100 of a portion of one edge of a protective case 10 according to the embodiment of the present invention depicted in FIG. 4A. This view depicts the construction of the first (lower or back) 102 and second (upper or front) 104 side panels of the protective case 10. The first side panel 102 is laminated of five layers including first 130, second 132, third 134, fourth 136, and fifth 138 layers. The first layer 130 may be an outer layer of knitted polyester fabric. The second layer 132 may be a neoprene cushioning layer, which also provides resistance to water ingress into the case 10. The third layer 134 may be a non-woven fabric layer of polyester fibers, which, because of its relative stiffness compared to the other layers, gives form to the first side panel 102 and to the case 10. As is known in the art, a non-woven fabric is typically formed, not by weaving or knitting, by bonding relatively short, separate fibers, usually into a sheet by mechanical or chemical methods. Polyester fibers are just one of many types of fibers that may be formed into non-woven fabrics. The fourth layer 136 may be an expanded foam (also known as EVA, for Ethylene Vinyl Acetate), which provides rubber-like cushioning but at lower cost. The fourth layer 136 may be preferably formed as shown into raised, discrete pads 106. The fifth layer 138 may be a knitted polyester fabric. The knitted polyester fabric layers 130, 138 provide a smooth, soft surface for the outer and inner layers. The layers of the first side panel 102 may be bonded together using heat, pressure and a light adhesive coating on the surfaces in contact. The second, neoprene layer may be approximately 0.050 to 0.060 inch thick, the third, non-woven fabric layer 134 may be approximately 0.020 to 0.030 inch thick, and the fourth, EVA layer 136 may be approximately 0.090 to 0.100 inch thick in the region of the raised pads 106 in the illustrated embodiment. As noted previously, each of the pads 106 may be shaped to mimic the outline shape of the individual trapped-gas cells that are disposed opposite to them so that the full area of each trapped-gas cell is backed up (on the opposite side of the device 30) by a full cushion surface when the case 10 is closed.

Continuing with FIG. 5A, the second side panel 104 is formed of two layers of transparent material such that a gas is trapped between the layers within each of a plurality of cells that extend throughout the second side panel. The trapped gas may typically be air. A first, outer layer 160 may be a sheet of optically clear Thermoplastic Polyurethane ("TPU") or its equivalent and having a thickness preferably in the range of 0.018 to 0.030 inch for the illustrated application. A thickness of 0.020 is selected for the present embodiment. The first layer 160, though flexible, is used in a substantially flat form in the illustrated embodiment to provide a smooth outer surface for the case 10 and should thus be somewhat thicker than the second layer 162. The second, inner layer 162 may also preferably be a sheet of TPU or its equivalent and may have slightly less thickness, typically in the range 0.013 to 0.020 inch. A thickness of 0.015 inch is selected for the present embodiment. The second layer 162, also quite flexible, is formed into the cells during a molding process as the second layer 162 is bonded by high frequency welding to the underside of the first layer 160 at the regions 166. The bonded regions 166 provide a gas-tight seal between and surrounding each of the closed volumes 164 thereby forming the gas-tight cells. The closed volumes 164 of the cells 108 are preferably filled with air that is trapped therein during the molding process. In some embodiments, air or gas may be injected into the closed volumes 164. As shown in FIG. 5A, each of the cells 108 extend inward into the interior space of the case 10, directly opposite the corresponding raised pads 106. As identified herein, the reference number 164 may include "closed volume 164," "enclosed volume 164," or simply refer to the gas or air that is trapped within the cells 108. The TPU material, which is generally available in either optically clear or tinted colors, may be treated to make them resistant to yellowing by sunlight. Several levels of anti-yellowing are available. The preferred grade for the present embodiments is 4, on a scale of 0 to 5 (5 being best), to preserve the optically clear properties of the material for many years.

It should be appreciated that the cushioning performance of the trapped-gas cells relies on the bonding of the first layer 160 to the second layer 162 in the regions 166, which completely surround the enclosed volumes 164 of each of the trapped-gas cells formed thereby. The bonding of the layers 160, 162 using the aforementioned high frequency welding process ensures that the trapped-gas cells will be well sealed from each other. Thus formed, the gas enclosed within the cells is trapped inside is disposed to provide the necessary cushioning by yielding to pressure exerted from outside the cells. The pressure thus exerted acts to compress the gas or, because of the flexibility of the first 160 and second 162 layers, to cause to gas to be displaced to another portion of the cell. By keeping the cell size and volume relatively small, there is little chance that the first and second layers will come into contact. Further, by using materials for the first 160 and second 162 layers that are flexible but relatively tough, there is also little possibility that the layers will stretch or become punctured by the range of collision incidents normally encountered during travel and transport of electronic devices and other instruments likely to be stored and carried in the protective carrying case of the present invention.

Continuing further with FIG. 5A, the peripheral side panel 116 is formed of first 140, second 142, and third 144 layers bonded together. The first 140 and third 144 layers may be a knitted polyester fabric as used in the first side panel 102. The second layer 142 may be a neoprene layer as used in the first side panel 102. These layers 140, 142, 144 may be gathered together along the edges of the case 10 and secured with stitching 150. Included in the layers stitched together may be the layers of the respective side panels 102, 104 and a bead 146 and bead welting 148, all gathered and sewn within bias tape 152. Also shown in FIG. 5A in cross section is a zip fastener 118 including the fabric tape 120 of the zip fastener structure. Typically, fabric tape 120 is a bias type fabric or other strong but thin fabric that is resistant to stretching. In the portions of the peripheral side panel 116 occupied by a zip fastener 118, the fabric tape 120 may comprise the entirety of the peripheral side panel 116 for protective cases having a thin profile as in the illustrative embodiment. The same structure of the peripheral side panel 116 is illustrated in both FIGS. 5A and 5B, with the same reference numbers.

FIG. 5B illustrates a detailed cross section view 200 of a portion of one edge of a protective case 10 according to an alternate embodiment of the present invention depicted in FIG. 4A. This view depicts the construction of the first (lower or back) 202 and second (upper or front) 204 side panels of the protective case 10. In this view, the structure of the case 10 as depicted is the same as in FIG. 5A except for the structure of the first side panel 202. The first side panel 202 is laminated of three layers including first 230, second 232, and third 234 layers. The first layer 230 is an outer layer of knitted polyester fabric. The second layer 232 may be neoprene or, alternatively be an expanded foam (also known as EVA, for Ethylene Vinyl Acetate), which provides rubber-like cushioning but at lower cost. The third layer 234 may be a knitted polyester fabric. The knitted polyester fabric layers 230, 234 provide a smooth, soft surface for the outer and inner layers. The layers are bonded together using heat, pressure and a light adhesive coating on the surfaces in contact. The second neoprene or EVA layer 232 may be approximately 0.090 to 0.100 inch thick in the region of the raised pads 206 in the illustrated embodiment. As noted previously, each of the pads 206 may be shaped to replicate the outline shape of the individual trapped-gas cells 208 that are disposed opposite to them in the second side panel 204 so that the full area of each trapped-gas cell 208 is backed up (on the opposite side of the device 36) by a full cushion surface when the case 10 is closed. The structure and materials of the second side panel 204 are the same as described in FIG. 5A, with reference numbers 200, 202, 204, and 208 corresponding to reference numbers 100, 102, 104, and 108 respectively.

Figure 6:
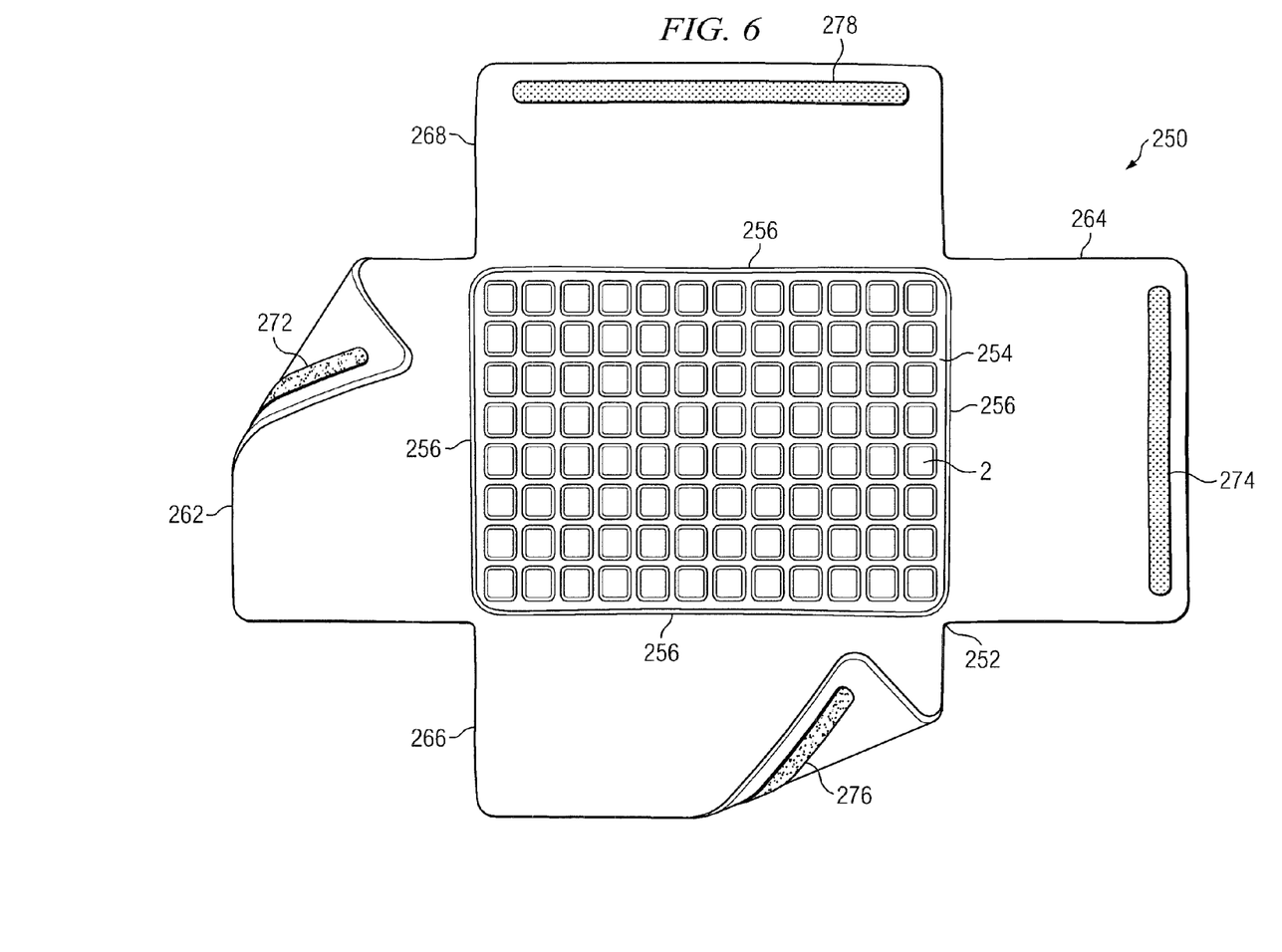
FIG. 6 illustrates a plan view of an alternate embodiment of a transparent carrying case according to the present invention.

FIG. 6 illustrates a plan view of an alternate embodiment of a transparent carrying case according to the present invention. The carrying case 250 includes a first side panel 252 adjoined to a transparent second side panel 254. The transparent panel 254 preferably includes a plurality of trapped-gas cells 258 disposed throughout its area within a perimeter 256 of the trapped-gas side panel 254, as described in the foregoing embodiments. The first side panel 252 is formed with a cut out center section so that the second side panel 254 just fits into and fills the space provided by the cut out center portion of the first side panel 252. The first 252 and second 254 side panels are joined together along the perimeter 256 of the second side panel 254. As mentioned, the second side panel 254 is fully transparent and is constructed as previously described in the foregoing embodiments.

The first side panel 252 includes first 262, second 264, third 266, and fourth 268 flaps that extend away from the perimeter 256 in the view shown in FIG. 6. Each of these flaps 262, 264, 266, and 268 includes one member of a hook and loop fastening device attached to a specified surface in approximately the location shown in FIG. 6. The size and exact position of the fastening devices mat be varied to suit the particular application. In the illustrated embodiment, first flap 262 includes a loop portion 272 disposed on the opposite (outer) surface of the flap 262. The second flap 264 includes a hook portion 274 of a hook and loop fastener disposed on the proximate (inner) surface of the flap 264. The third flap 266 includes a loop portion 276 of a hook and loop fastener disposed on the opposite (outer) surface of the flap 266. The fourth flap 268 includes a loop portion 278 disposed on the proximate (inner) surface of the flap 268. In use, after a laptop computer or other article (not shown, it being understood to be in the same relative orientation and placement as the embodiments illustrated in FIGS. 2, 5A, and 5B) is placed, face down upon the transparent second side panel 254, the flaps are folded over the laptop computer or other article, one-by-one, in the order 262, 264, 266, and 268. As the flap 264 is folded over flap 262, the portion of the flap having the loop fastener 274 is pressed against the corresponding portion 272 of the flap 262 to engage the hook and loop fastener. Similarly, as the flap 268 is folded over flap 266, the portion of the flap having the loop fastener 278 is pressed against the corresponding portion 276 of the flap 266 to engage the hook and loop fastener, thereby securing the transparent carrying case 250 and the laptop computer or other article within the case 250.

The carrying case illustrated in FIG. 6 may be constructed in the same or similar manner as the foregoing embodiments, using the same or similar materials. This embodiment is illustrated to show that the transparent carrying case may be implemented in a variety of ways, of which the one illustrated in FIG. 6 is but one such variation, which nevertheless has all of the same advantages as the embodiments illustrated in FIGS. 1 and 2, etc.

While the invention has been shown in only one of its forms, it is not thus limited but is susceptible to various changes and modifications without departing from the spirit thereof. For example, in other embodiments, the raised pads 13 shown in FIG. 1 (and the following FIGS. 2 through 5A & 5B) may not be required, the first side panel 12 being constructed as a cushioned panel without such features as the raised pads. Further, illustratively, the first side panel 12, e.g., as in FIG. 1, may be formed as a single sheet of cushioned material. In another alternate embodiment, to the ones illustrated in FIGS. 5A and 5B, the transparent side panels 104, 204 may be inverted in configuration so that the trapped-gas cells extend toward the outside of the case 100, 200, and the smooth surface of the transparent side panels is disposed toward the inside of the case 100, 200. In still other embodiments, the trapped-gas cells may extend in both directions, outside and inside the respective case 100, 200.

What is claimed is:

1. A protective case for a portable electronic device, comprising:
    a first side panel including first, second, third, and fourth layers, respectively a knitted polyester fabric, a neoprene layer for cushioning, a non-woven fabric, and an ethylene vinyl acetate (EVA) foam material layer, said fourth layer disposed next to said third non-woven fabric layer and bonded to a fifth layer of a knitted polyester fabric; and
    a second, flexible and optically clear transparent side panel, connected to said first side panel around corresponding perimeters thereof to form said case;
    wherein said second side panel is formed of a first substantially flat transparent layer and a second transparent layer bonded thereto along respective outlines defining a plurality of rows and columns of a plurality of small, closely-spaced, trapped-gas cells disposed between said first and second transparent layers, each said cell having a rectangular cross section and extending inward of said case in raised opposition from said first substantially flat transparent layer toward said first side panel having a gas trapped therein, and being fully sealed from each other.

2. The case of claim 1, further comprising:
    an openable seam disposed along and between at least a portion of said connected perimeters of said first and second side panels.

3. The case of claim 2, further comprising:
    at least one continuous fastener disposed along said openable seam for opening and closing said seam.

4. The case of claim 1, further comprising:
    a third side panel connected between said first and second side panels around their respective perimeters, said third side panel including an openable seam disposed along at least a portion thereof.

5. The case of claim 4, further comprising:
    at least one continuous fastener disposed along said openable seam for opening and closing said seam.

6. The case of claim 5, wherein said continuous fastener comprises a fastener selected from the group consisting of a zip fastener and a hook-and-loop strip fastener.

7. The case of claim 4, wherein said third side panel is formed of a laminated fabric including at least one cushion layer.

8. The case of claim 4, further comprising:
    at least one fastening means disposed proximate said openable seam for closure thereof.

9. The case of claim 1, wherein said first side panel is formed as a planar array of a plurality of cushioned segments having the same shape and disposition as said trapped-gas cells of said second side panel.

10. The case of claim 1, wherein said first, second, and third layers of said first side panel are bonded together under a combination of adhesive, heat, and pressure.

11. The case of claim 1, wherein first and second transparent layers forming said trapped-gas cells of said second side panel are formed of flexible, optically clear thermoplastic polyurethane (TPU).

12. The case of claim 1, wherein said trapped-gas cells contain a gas trapped between said first and second transparent layers and said first and second layers are sealed around each cell with welded seams.

13. The case of claim 1, wherein the trapped-gas cells contain air or any constituent thereof.

14. The case of claim 1, wherein said trapped-gas cells disposed between said first and second transparent layers alternatively comprise an outline shape selected from the group consisting of round, triangular, hexagonal, and star-shaped.

15. The case of claim 1, wherein said trapped-gas cells disposed between said first and second transparent layers are of uniform shape and size.

* * * * *